United States Patent
Lee et al.

(10) Patent No.: US 8,121,206 B2
(45) Date of Patent: Feb. 21, 2012

(54) APPARATUS AND METHOD FOR ESTIMATING DELAY SPREAD OF MULTI-PATH FADING CHANNEL IN OFDM SYSTEM

(75) Inventors: Hyun Suk Lee, Gyunggi-do (KR); Se Bin Im, Gyunggi-do (KR); Je Hyuk Ryu, Gyunggi-do (KR); Jae Goon Aum, Gyunggi-do (KR); Jung Tae Kim, Gyunggi-do (KR); Hyung Jin Choi, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 736 days.

(21) Appl. No.: 12/193,494

(22) Filed: Aug. 18, 2008

(65) Prior Publication Data
US 2009/0168908 A1 Jul. 2, 2009

(30) Foreign Application Priority Data
Dec. 27, 2007 (KR) .......................... 10-2007-139458

(51) Int. Cl.
*H04L 27/28* (2006.01)

(52) U.S. Cl. ........ 375/260; 375/267; 375/340; 375/346; 370/203; 370/206; 370/208; 370/210

(58) Field of Classification Search .................. 375/260, 375/267; 370/203–208
See application file for complete search history.

(56) References Cited

U.S. PATENT DOCUMENTS

| | | | |
|---|---|---|---|
| 7,088,672 B2 * | 8/2006 | Kim | 370/208 |
| 7,474,611 B2 * | 1/2009 | Svensson et al. | 370/208 |
| 2006/0146948 A1 * | 7/2006 | Park et al. | 375/260 |
| 2010/0039925 A1 * | 2/2010 | Bhushan et al. | 370/204 |

FOREIGN PATENT DOCUMENTS

JP 2007263987 * 10/2011

* cited by examiner

*Primary Examiner* — Khanh C Tran
*Assistant Examiner* — Eboni Hughes
(74) *Attorney, Agent, or Firm* — Lowe, Hauptman, Ham & Berner, LLP

(57) ABSTRACT

Provided is an apparatus for estimating a delay spread of a multi-path fading channel in an Orthogonal Frequency Division Multiplexing (OFDM) system. The apparatus is applied to an OFDM receiver including a channel equalization unit compensating channel distortion by estimating channel distortion at pilot locations with respect to output signals of an FFT unit.

2 Claims, 6 Drawing Sheets

<APPARATUS FOR ESTIMATING DELAY SPREAD>

APPARATUS AND METHOD FOR ESTIMATING DELAY SPREAD OF MULTI-PATH FADING CHANNEL IN OFDM SYSTEM

CROSS-REFERENCE TO RELATED APPLICATIONS

This application claims the priority of Korean Patent Application No. 2007-139458 filed on Dec. 27, 2007 in the Korean Intellectual Property Office, the disclosure of which is incorporated herein by reference.

BACKGROUND OF THE INVENTION

1. Field of the Invention

The present invention relates to an apparatus and method for estimating a delay spread of a multi-path fading channel, which is applicable to an Orthogonal Frequency Division Multiplexing (OFDM) system, and more particularly, to an apparatus and method for estimating a multi-path maximum delay time in an OFDM system, which is designed to have an output characteristic proportional to a delay length by using a channel estimation value difference between adjacent channels at locations of pilot signals. The apparatus and method determines a maximum power response location by detecting only a maximum power value without setting a threshold value, thereby estimating a maximum delay path correctly.

2. Description of the Related Art

In general, Orthogonal Frequency Division Multiplexing (OFDM) is a modulation scheme suitable for high-speed data transmission in wired/wireless channels. Recently, a variety of high-speed communication systems have adopted OFDM as a transmission scheme. If a single carrier scheme is used for high-speed data transmission with a short symbol period in a wireless communication channel having multi-path fading, inter-symbol interference (ISI) becomes severer and the complexity of a receiving end greatly increases. On the other hand, a multi-carrier scheme can extend a symbol period on each sub-carrier by the number of sub-carriers, without decreasing a data rate. Therefore, the multi-carrier scheme can cope with severe frequency selective fading channels, which are caused by multi-path, by using a simple 1-tab equalizer.

Furthermore, the OFDM scheme has high frequency efficiency because it uses multiple orthogonal carriers. The modulation and demodulation of the multiple carriers in a receiving end and a transmitting end are the same as the execution of Inverse Discrete Fourier Transform (IDFT) and Discrete Fourier Transform (DFT), respectively. Therefore, high-speed modulation and demodulation can be implemented using Inverse Fast Fourier Transform (IFFT) and Fast Fourier Transform (FFT), respectively. Such an OFDM scheme was adopted as standards for IEEE 802.11a, IEEE 802.16a/d, DAB/DMB, and DVB-T because it is suitable for high-speed data transmission.

OFDM signals experiencing multi-path fading channels are affected by frequency selective channels in the frequency domain. Therefore, in order for stable channel estimation, pilot signals are transmitted at specific sub-carrier locations so that the OFDM signals can be adapted to variation of frequency-domain channels. In this case, intervals of the pilot signals are designed considering a delay spread of a multi-path fading channel. If the delay spread increases and the channel extremely varies within the predefined intervals of pilots, channel estimation error occurs and demodulation performance is greatly degraded.

In order to minimize the performance degradation, the characteristics of the multi-path fading channel should be known in the channel estimation process. Among them, information on the channel delay spread is most important.

FIG. 1 illustrates locations of pilot signals in an OFDM system.

In the OFDM system of FIG. 1, a transmit signal with multiple sub-carriers includes pilot signals carried on a specific carrier in order for estimating channel distortion caused by a multi-path fading and acquiring a frequency and time synchronization of a receive signal.

As illustrated in FIG. 1, the pilot signals are carried on sub-carriers spaced at constant intervals M within the transmit signal, and sub-carriers other than the pilot sub-carriers are used for data transmission.

In an OFDM receiver using the pilot signals carried on the specific sub-carriers at constant intervals, an initial channel estimation is directly performed only at the locations of the pilot signals, and a channel estimation for data signals between the pilot signals is performed using channel estimation values of the pilot signals by an interpolation process or the like.

Meanwhile, the initial channel estimation values at the locations of the pilot signals are also used for estimating a delay spread of a multi-path fading channel, and the accuracy of the interpolation process can be increased by the estimated delay spread value.

FIG. 2 is a block diagram illustrating an apparatus for estimating a delay spread in an OFDM system according to the related art. Referring to FIG. 2, the OFDM system according to the related art includes an OFDM transmitter 10, a wireless channel, and an OFDM receiver 20. The OFDM receiver 20 includes an RF receiving unit 21 converting an RF transmit signal into an IF signal, an FFT unit 22 performing an FFT process to transform the time-domain IF signal into a frequency-domain IF signal, a channel equalization unit 23 estimating and compensating channel distortion of a signal output from the FFT unit 22, and a data demodulation unit 24 demodulating an output signal of the channel equalization unit 23 into the original data.

In the operation of the channel equalization unit 23, an initial channel estimator 23A estimates channel distortion of pilot sub-carriers from the output signal of the FFT unit 22. A channel interpolator 23B performs an interpolation process to calculate channel estimation values of data between the pilots by using the channel estimation values that are obtained at the locations of the pilot signals by the initial channel estimator 23A. A channel equalizer 23C compensates channel distortion by using the channel estimation values output from the channel interpolator 23B. A delay spread estimator 23D converts the channel estimation values, which are obtained at the locations of the pilot signals by the initial channel estimator 23A, into time-domain values, and estimates a maximum delay location by estimating impulse responses.

The time-domain receive signal input to the FFT unit 22 can be expressed as the following Equation (1):

$$y_n = h_n \times x_n + w_n = \sum_{l=0}^{L-1} h_l \cdot x_{n-l} + w_n \quad (1)$$

where $y_n$ is the receive signal, $h_n$ is the impulse response of the channel, $x_n$ is the transmit signal, and $w_n$ is noise component.

In this case, the time-domain receive signal is transformed into the frequency-domain signal through the FFT process of the FFT unit 22. The frequency-domain signal is expressed as the following Equation (2):

$$Y_k = H_k X_k + W_k \quad (2)$$

where $Y_k$, $H_k$, $X_k$ and $W_k$ represents the Fourier-transformed values of $y_n$, $h_n$, $x_n$ and $w_n$, respectively.

Next, the initial channel estimator 23A estimates the initial channel values at the locations of the pilot signals. The estimation process is expressed as the following Equation (3):

$$H_k = Y_k / X_k = H_k + W_k / X_k \quad (3)$$

Next, the delay spread estimator 23D includes an IFFT unit 23D-1, an effective impulse response estimation unit 23D-2, and a maximum delay location estimation unit 23D-3.

The IFFT unit 23D-1 performs an IFFT process on the initial channel estimation values, and outputs the IFFT-processed initial channel estimation values to the effective impulse response estimation unit 23D-2. The effective impulse response estimation unit 23D-2 detects the impulse responses having power higher than a threshold value, which is set to noise power, and outputs the detected impulse responses to the maximum delay location estimation unit 23D-3. The maximum delay location estimation unit 23D-3 detects an impulse response value having the greatest sample index value among the detected effective impulse response values.

The above-described process is expressed as the following Equation (4):

$$\tau_{max} = \max[n] l |h_n^2| > \Gamma \quad (4)$$

In the above process, the detected impulse response location is a value that is determined as a maximum delay path by the delay spread of the multi-path fading channel.

The delay spread estimation of the delay spread estimation unit according to the related art uses the impulse response of the basic channel, but a process of setting the impulse response value through the estimation of noise power is followed. Therefore, when the power of the impulse response value for the maximum delay path is similar to the noise power, it is difficult to detect the effective impulse response.

SUMMARY OF THE INVENTION

An aspect of the present invention provides an apparatus and method for estimating a multi-path maximum delay time in an Orthogonal Frequency Division Multiplexing (OFDM) system, which is designed to have an output characteristic proportional to a delay length by using a channel estimation value difference between adjacent channels at locations of pilot signals. The apparatus and method determines a maximum power response location by detecting only a maximum power value without setting a threshold value, thereby estimating a maximum delay path correctly.

According to an aspect of the present invention, there is provided an apparatus for estimating a delay spread of a multi-path fading channel in an OFDM system. The apparatus is applied to an OFDM receiver including a channel equalization unit compensating channel distortion by estimating channel distortion at pilot locations with respect to output signals of a Fast Fourier Transform (FFT) unit. The apparatus includes: a channel estimation difference calculating unit calculating an estimation value difference between adjacent channels among channel estimation values that are calculated at pilot locations by the channel equalization unit; an Inverse Fast Fourier Transform (IFFT) unit performing an IFFT process on the estimation value difference output from the channel estimation difference calculating unit, and outputting time-domain impulse response signals; and a maximum delay time calculating unit finding a maximum power response location among the impulse response signals output from the IFFT unit, calculating a maximum delay time from a first location to the maximum power response location among output terminals outputting the impulse responses of the IFFT unit, and outputting the maximum delay time to the channel equalization unit.

The number of the output terminals of the IFFT unit may be less than that of the FFT unit.

According to another aspect of the present invention, there is provided a method for estimating a delay spread of a multi-path fading channel in an OFDM system. The method is applied to an OFDM receiver including a channel equalization unit compensating channel distortion by estimating channel distortion at pilot locations with respect to output signals of a Fast Fourier Transform (FFT) unit. The method includes: calculating, by a channel estimation difference calculating unit, an estimation value difference between adjacent channels among channel estimation values that are calculated at pilot locations by the channel equalization unit; performing, by an Inverse Fast Fourier Transform (IFFT) unit, an IFFT process on the estimation value difference output from the channel estimation difference calculating unit, and outputting time-domain impulse response signals; and finding, by a maximum delay time calculating unit, a maximum power response location among the impulse response signals output from the IFFT unit, calculating a maximum delay time from a first location to the maximum power response location among output terminals outputting the impulse responses of the IFFT unit, and outputting the maximum delay time to the channel equalization unit.

The number of the output terminals of the IFFT unit may be less than that of the FFT unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
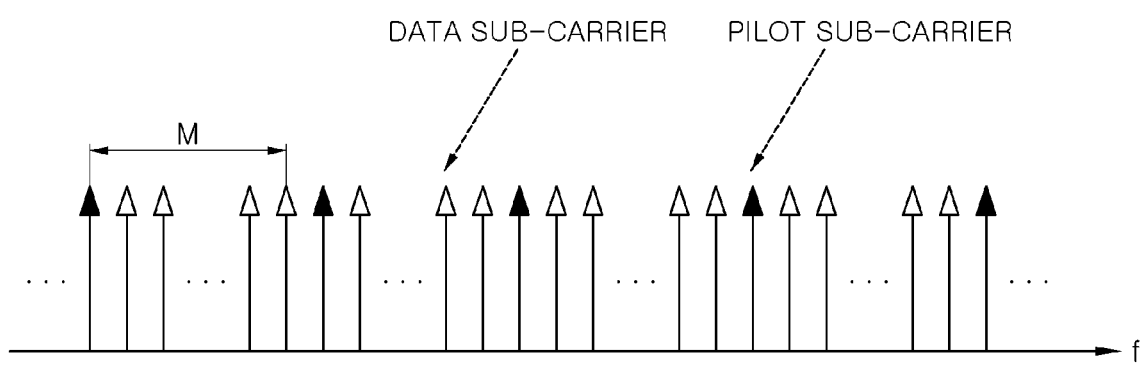
FIG. 1 illustrates locations of pilot signals in an Orthogonal Frequency Division Multiplexing (OFDM) system.
Figure 2:
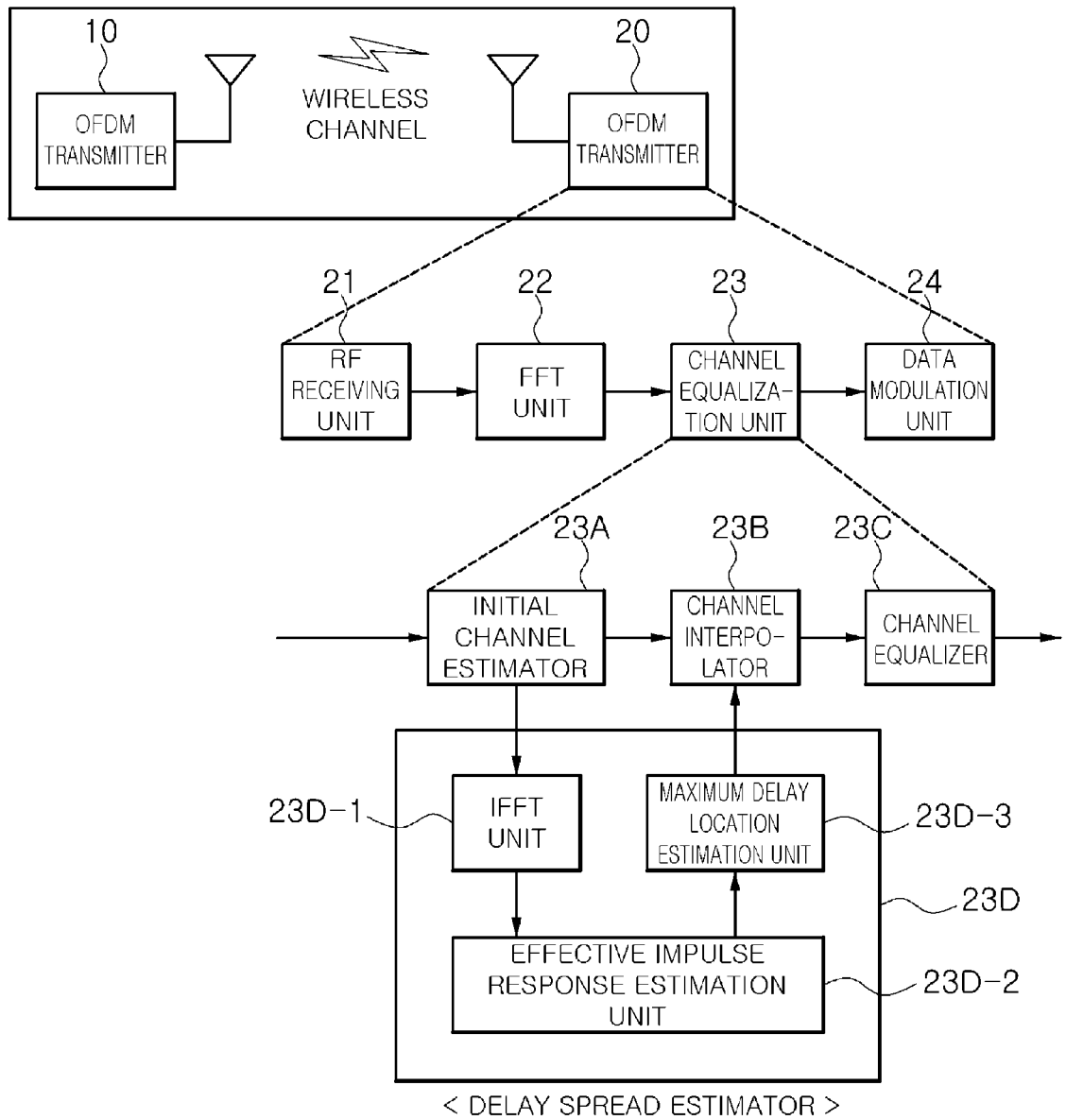
FIG. 2 is a block diagram illustrating an apparatus for estimating a delay spread in an OFDM system according to the related art.

Exemplary embodiments of the present invention will now be described in detail with reference to the accompanying drawings.

The present invention is not limited to the exemplary embodiments. The description of the exemplary embodiments is made for understand the technical spirit of the present invention. Like reference numerals are used to refer to like elements throughout the accompanying drawings.

Figure 3:
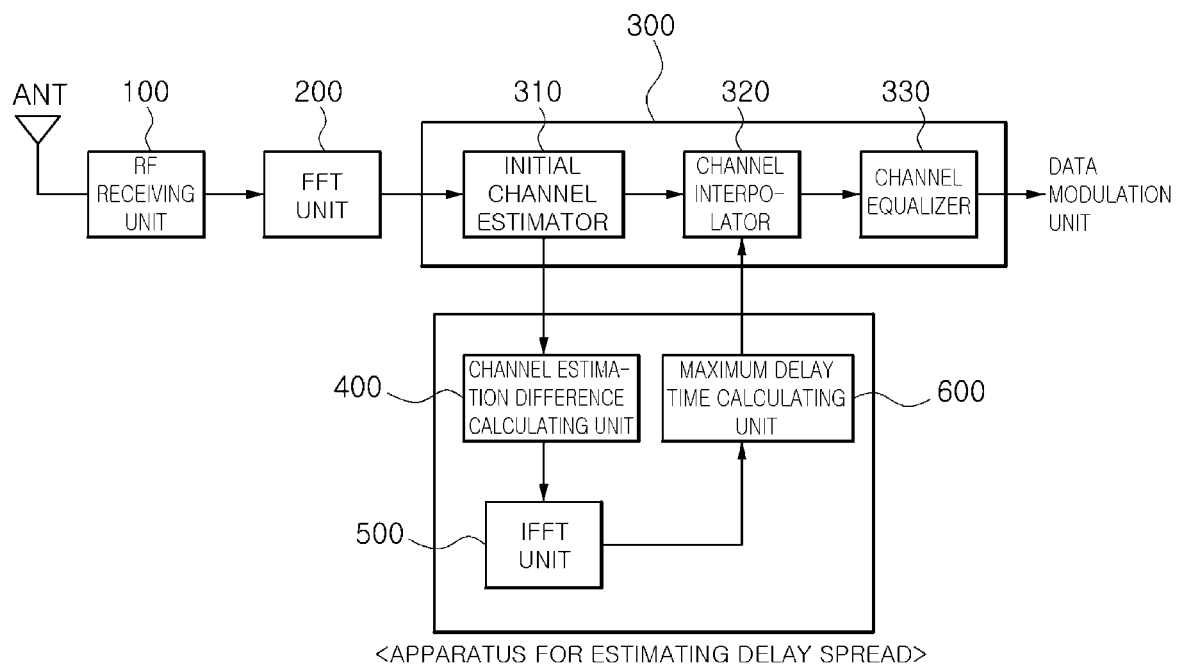
FIG. 3 is a block diagram illustrating an apparatus for estimating a delay spread in an OFDM system according to an embodiment of the present invention.

FIG. 3 is a block diagram illustrating an apparatus for estimating a delay spread in an Orthogonal Frequency Division Multiplexing (OFDM) system according to an embodiment of the present invention. The apparatus for estimating the delay spread in the OFDM system according to the embodiment of the present invention is applied to an OFDM receiver including a channel equalization unit 300 compensating channel distortion by estimating the channel distortion at locations of pilot signals with respect to output signals of an FFT unit 200.

In the apparatus for estimating the delay spread, a channel estimation difference calculating unit 400 calculates a estimation value difference between adjacent channels among channel estimation values that are calculated at locations of pilot signals by the channel equalization unit 300. An IFFT unit 500 performs an IFFT process on the estimation value difference output from the channel estimation difference calculating unit 400, and outputs time-domain impulse response signals. A maximum delay time calculating unit 600 finds a maximum power response location among the impulse response signals output from the IFFT unit 500, calculates a maximum delay time from the first location to the maximum power response location among output terminals outputting the impulse responses of the IFFT unit 500, and outputs the maximum delay time to the channel equalization unit 300.

In addition, the number of the output terminals of the IFFT unit 500 is less than that of the FFT unit 200.

Figure 4:
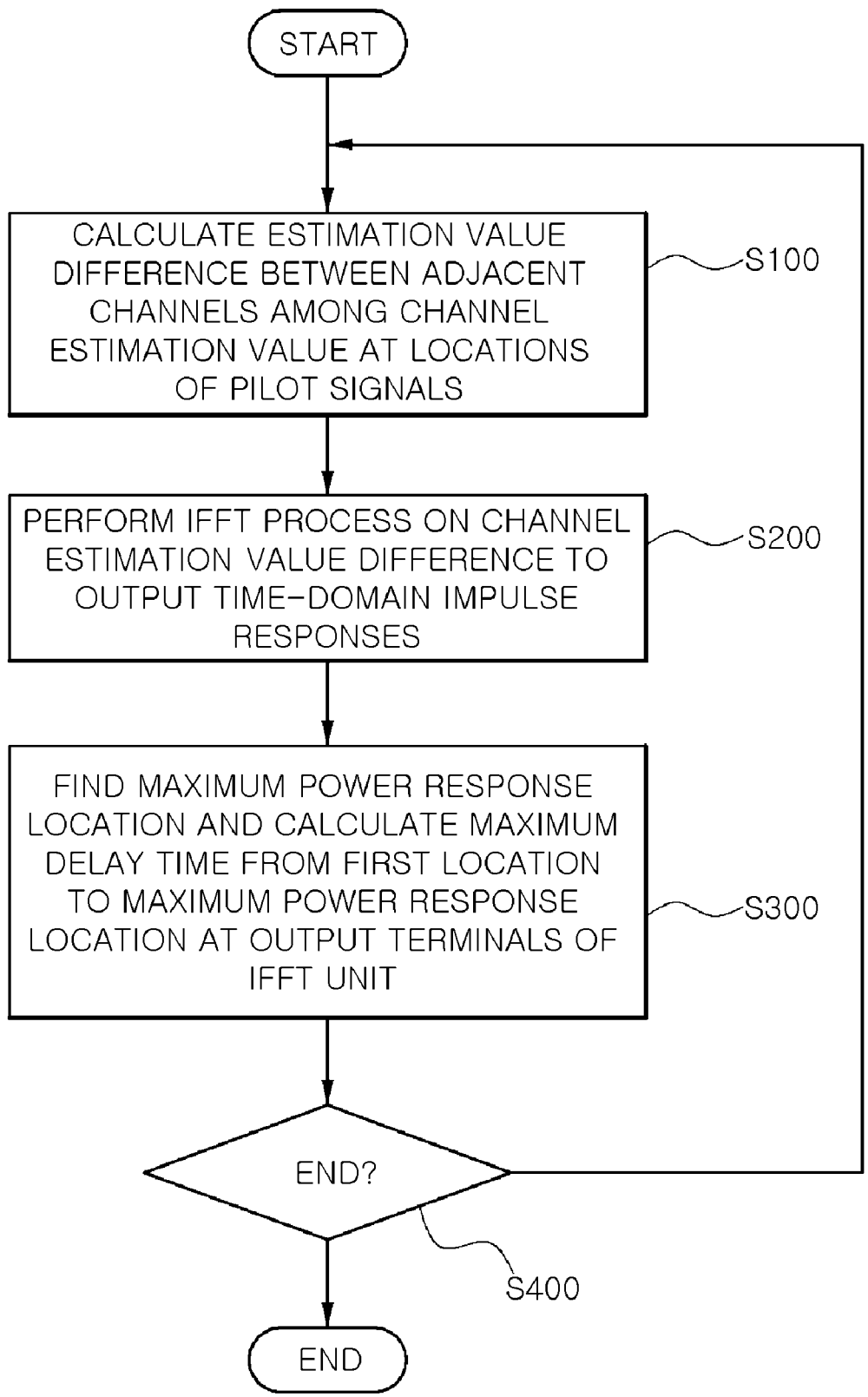
FIG. 4 is a flowchart illustrating a method for estimating a delay spread in an OFDM system according to an embodiment of the present invention.

FIG. 4 is a flowchart illustrating a method for estimating a delay spread in an OFDM system according to an embodiment of the present invention.

Referring to FIG. 4, the method for estimating the delay spread in the OFDM system according to the embodiment of the present invention is applied to an OFDM receiver including a channel equalization unit 300 compensating channel distortion by estimating the channel distortion at locations of pilot signals with respect to output signals of an FFT unit 200.

In operation S100, the channel estimation difference calculating unit 400 calculates a estimation value difference between adjacent channels among channel estimation values that are calculated at locations of pilot signals by the channel equalization unit 300. In operation S200, the IFFT unit 500 performs an IFFT process on the estimation value difference output from the channel estimation difference calculating unit 400, and outputs time-domain impulse response signals. In operation S300, the maximum delay time calculating unit 600 finds a maximum power response location among the impulse response signals output from the IFFT unit 500, calculates a maximum delay time from the first location to the maximum power response location among output terminals outputting the impulse responses of the IFFT unit 500, and outputs the maximum delay time to the channel equalization unit 300.

In addition, the number of the output terminals of the IFFT unit 500 is less than that of the FFT unit 200.

Figure 5:
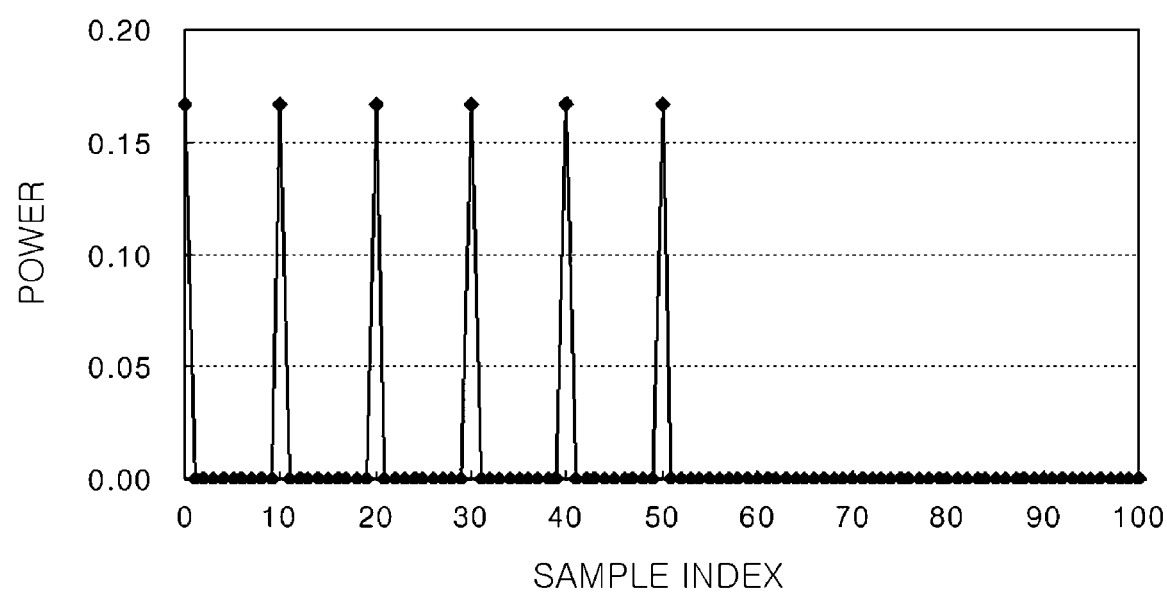
FIG. 5 is an output characteristic graph of the apparatus for estimating the delay spread according to the related art.
Figure 6A:
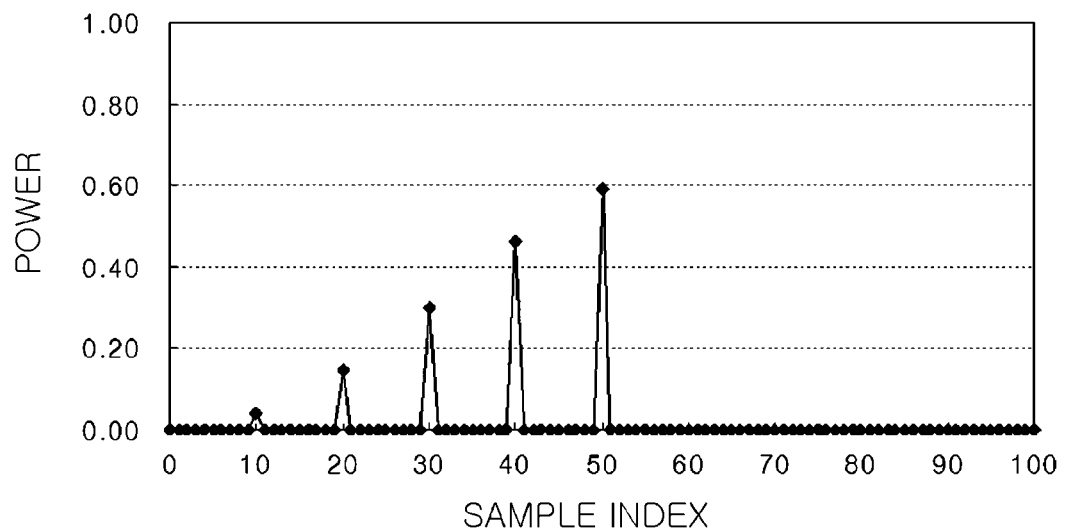
FIGS. 6(*a*) and 6(*b*) are output characteristic graphs of the apparatus for estimating the delay spread according to the embodiment of the present invention.

FIG. 5 is an output characteristic graph of the apparatus for estimating the delay spread according to the related art, and FIG. 6(a) is an output characteristic graph of the apparatus for estimating the delay spread according to the embodiment of the present invention.

Referring to FIG. 5 showing power of the sample index, the apparatus according to the related art exhibits uniform distribution because the impulse response of the channel is output without change.

Referring to the graph of FIG. 6(a), the proposed estimator output increases as the delay length is longer.

Figure 6B:
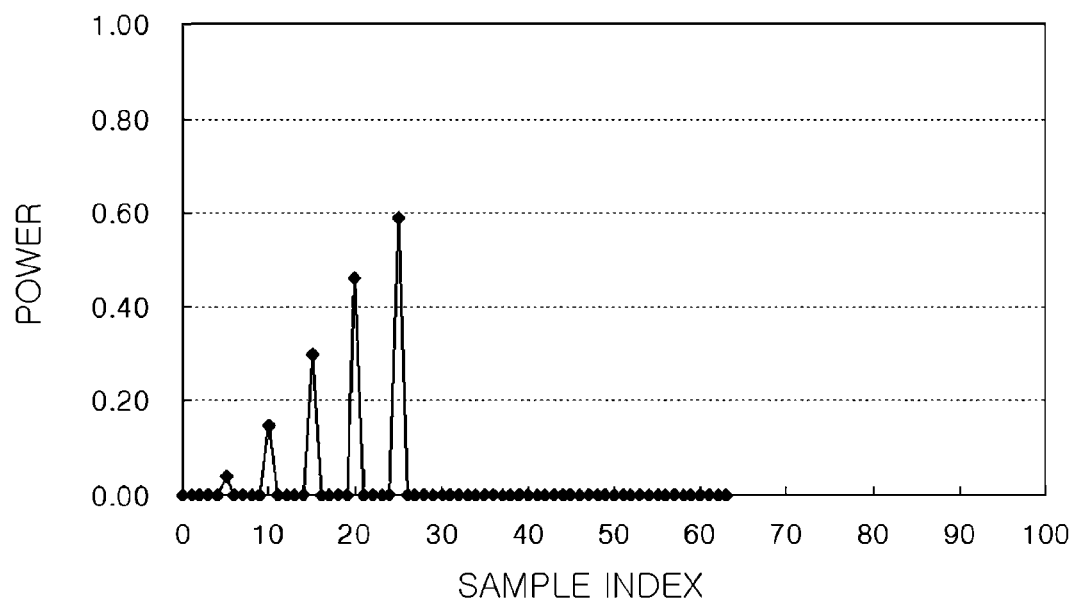

Referring to FIG. 6(b), as the number of the output terminals of the IFFT unit decreases, the present invention can reduce the implementation complexity.

The operation and effect of the present invention will be described below in detail with reference to the accompanying drawings.

The apparatus and method for estimating the delay spread in the OFDM system according to the present invention will be described with reference to FIGS. 3 through 6.

Referring to FIG. 3, the apparatus for estimating the delay spread in the OFDM system according to the present invention is applied to the OFDM receiver including the channel equalization unit 300 compensating the channel distortion by estimating the channel distortion at the locations of the pilot signals respect to the output signal of the FFT unit 200. The apparatus for estimating the delay spread calculates the maximum delay time, based on the channel estimation values output from the channel equalization unit 300, and feeds back the calculated maximum delay time to the channel equalization unit 300, thereby contributing to the improvement of the channel interpolation accuracy in the channel equalization unit 300.

The apparatus for estimating the delay spread according to the present invention includes the channel estimation difference calculating unit 400, the IFFT unit 500, and the maximum delay time calculating unit 600.

The channel estimation difference calculating unit 400 calculates the estimation value difference between the adjacent channels among the channel estimation values that are calculated at locations of pilot signals by the channel equalization unit 300, and outputs the calculated estimation value difference to the IFFT unit 500.

That is, the channel estimation difference calculating unit 400 calculates the difference ($\Delta H_k$) between the estimation values of the adjacent channels with respect to the initial channel estimation value, based on the following Equation 5:

$$\Delta H_k = H_{k+M} - H_k \quad (5)$$

where K is a natural number, and M is an interval of the pilots.

The IFFT unit 500 performs the IFFT process on the estimation value difference output from the channel estimation difference calculating unit 400, and outputs the time-domain impulse response signal to the maximum delay time calculating unit 600.

That is, the time-domain output value with respect to the estimation value difference of the adjacent channels can be obtained by the IFFT process of the IFFT unit 500. The time-domain estimation value differences use the fact that the power characteristic at the multi-path delay location is proportional to the corresponding delay length.

Referring to FIGS. 5 and 6(a), the apparatus according to the related art exhibits a uniform distribution characteristic because the impulse response of the channel is output without change. However, referring to FIG. 6(a), the apparatus according to the present invention exhibits that the output value increases as the delay length is longer.

More specifically, when comparing the output characteristic of the apparatus according to the present invention with the output characteristic of the apparatus according to the related art, the related art exhibits a uniform distribution characteristic because the impulse response of the channel is output without change, in view of the output value of the delay spread estimator with respect to the multi-path fading channel, which is set based on the uniform delay profile in an environment where noise is not considered.

However, the present invention exhibits that the output value increases as the delay length is longer. Therefore, the apparatus and method of the present invention can detect the signals more accurately than the related art.

Meanwhile, the number of the output terminals of the IFFT unit 500 may be less than that of the FFT unit 200.

Referring to FIG. 6(*b*), as the number of the output terminals of the IFFT unit decreases, the present invention can reduce the implementation complexity.

As described above, the additional advantage of the present invention is that the implementation complexity can be flexibly reduced. That is, if the adjacent channel difference operation is performed only on some of the initial channel values at the locations of the pilot signals, the present invention can be implemented with IFFT having a smaller computation amount than the FFT size.

In this case, the maximum delay path location is reduced by the relative IFFT size ratio, and the delay spread value can be obtained by multiplying the reciprocal of the ratio.

As one example, the graph of FIG. 6(*b*) exhibits the output characteristic when the IFFT size corresponding to the graph of FIG. 6(*a*) is reduced by ½.

The method for estimating the delay spread in the OFDM system according to the present invention will be described below with reference to FIGS. 3 to 6.

Referring to FIG. 4, the method for estimating the delay spread in the OFDM system according to the embodiment of the present invention is applied to the OFDM receiver including the channel equalization unit 300 compensating channel distortion by estimating the channel distortion at the locations of the pilot signals with respect to the output signal of the FFT unit 200. The maximum delay time is calculated, based on the channel estimation values output from the channel equalization unit 300, and is fed back to the channel equalization unit 300, thereby contributing to the improvement of the channel interpolation accuracy in the channel equalization unit 300.

In operation S100, the channel estimation difference calculating unit 400 calculates the estimation value difference between the adjacent channels among the channel estimation values that are calculated at pilot locations by the channel equalization unit 300.

In operation S200, the IFFT unit 500 performs the IFFT process on the estimation value difference output from the channel estimation difference calculating unit 400, and outputs the time-domain impulse response signal.

The maximum delay time calculating unit 600 finds the maximum power response location among the impulse response signals output from the IFFT unit 500, calculates the maximum delay time from the first location to the maximum power response location among output terminals outputting the impulse responses of the IFFT unit 500, and outputs the maximum delay time to the channel equalization unit 300.

The method of the present invention will be described with reference to FIGS. 5 and 6. FIG. 5 is an output characteristic graph of the apparatus for estimating the delay spread according to the related art, and FIGS. 6(*a*) and 6(*b*) are output characteristic graphs of the apparatus for estimating the delay spread according to the embodiment of the present invention.

Referring to FIG. 5 showing power of the sample index, the apparatus according to the related art exhibits a uniform distribution characteristic because the impulse response of the channel is output without change.

Referring to FIG. 6(*a*), the proposed estimator output increases as the delay length is longer.

Therefore, the method of the present invention can achieve more accurate detection than the related art. The additional advantage of the present invention is that the implementation complexity can be flexibly reduced.

Meanwhile, the number of the output terminals of the IFFT unit 500 is less than that of the FFT unit 200.

Referring to FIG. 6(*b*), as the number of the output terminals of the IFFT unit decreases, the implementation complexity can be reduced.

That is, if the adjacent channel difference operation is performed only on some of the initial channel values at the pilot locations, the present invention can be implemented with IFFT having a smaller computation amount than the FFT size.

In this case, the maximum delay path location is reduced by the relative IFFT size ratio, and the delay spread value can be obtained by multiplying the reciprocal of the ratio.

As one example, the graph of FIG. 6(*b*) exhibits the output characteristic when the IFFT size corresponding to the graph of FIG. 6(*a*) is reduced by ½.

As described above, the OFDM system according to the present invention can calculate the time-domain impulse response using the channel estimation value difference between the adjacent channels at the pilot locations, and estimate the maximum delay time according to the impulse response.

According to the present invention, the OFDM system is designed to have the output characteristic proportional to the delay length by using the difference between channel estimation values of the adjacent channels at the pilot locations. The maximum power response location is determined by detecting only the maximum power value without setting of the threshold value. Therefore, the maximum delay path can be correctly estimated.

Furthermore, the present invention can improve the detection characteristics for the delay spread of the multi-path fading channel and can flexibly control the computation amount for the estimation of the delay spread.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for estimating a delay spread of a multi-path fading channel in an Orthogonal Frequency Division Multiplexing (OFDM) system, the apparatus being applied to an OFDM receiver including a channel equalization unit compensating channel distortion by estimating channel distortion at pilot locations with respect to output signals of a Fast Fourier Transform (FFT) unit, the apparatus comprising:

a channel estimation difference calculating unit calculating an estimation value difference between adjacent channels among channel estimation values that are calculated at pilot locations by the channel equalization unit;

an Inverse Fast Fourier Transform (IFFT) unit performing an IFFT process on the estimation value difference output from the channel estimation difference calculating unit, and outputting time-domain impulse response signals; and a maximum delay time calculating unit finding a maximum power response location among the impulse response signals output from the IFFT unit, calculating a maximum delay time from a first location to the maximum power response location among output terminals outputting the impulse responses of the IFFT unit, and outputting the maximum delay time to the channel equalization unit, wherein the number of the output terminals of the IFFT unit is less than that of the FFT unit.

2. A method for estimating a delay spread of a multi-path fading channel in an OFDM system, the method being applied to an Orthogonal Frequency Division Multiplexing (OFDM) receiver including a channel equalization unit compensating channel distortion by estimating channel distortion at pilot locations with respect to output signals of a Fast Fourier Transform (FFT) unit, the method comprising:

calculating, by a channel estimation difference calculating unit, an estimation value difference between adjacent channels among channel estimation values that are calculated at pilot locations by the channel equalization unit;

performing, by an Inverse Fast Fourier Transform (IFFT) unit, an IFFT process on the estimation value difference output from the channel estimation difference calculating unit, and outputting time-domain impulse response signals; and finding, by a maximum delay time calculating unit, a maximum power response location among the impulse response signals output from the IFFT unit, calculating a maximum delay time from a first location to the maximum power response location among output terminals outputting the impulse responses of the IFFT unit, and outputting the maximum delay time to the channel equalization unit, wherein the number of the output terminals of the IFFT unit is less than that of the FFT unit.

* * * * *